United States Patent
Zannoni et al.

(10) Patent No.: US 12,051,988 B2
(45) Date of Patent: Jul. 30, 2024

(54) ELECTRIC MOTOR FURNITURE DRIVE

(71) Applicant: Dewertokin Technology Group Co., Ltd., Zheijang (CN)

(72) Inventors: Luca Zannoni, Cesena (IT); Paolo Presepi, Cervia (IT); Simone Fiore, San Mauro Pascoli (IT)

(73) Assignee: Dewertokin Technology Group Co., Ltd, Jiaxing (CN)

( * ) Notice: Subject to any disclaimer, the term of this patent is extended or adjusted under 35 U.S.C. 154(b) by 226 days.

(21) Appl. No.: 17/786,914

(22) PCT Filed: Dec. 18, 2020

(86) PCT No.: PCT/EP2020/087180
§ 371 (c)(1),
(2) Date: Jun. 17, 2022

(87) PCT Pub. No.: WO2021/123279
PCT Pub. Date: Jun. 24, 2021

(65) Prior Publication Data
US 2023/0017386 A1     Jan. 19, 2023

(30) Foreign Application Priority Data
Dec. 20, 2019   (DE) .................... 20 2019 107 189.3

(51) Int. Cl.
*H02P 7/03*   (2016.01)
(52) U.S. Cl.
CPC ..................... *H02P 7/05* (2016.02)
(58) Field of Classification Search
CPC ...... H02P 1/04; H02P 1/22; H02P 1/24; H02P 1/26; H02P 1/30; H02P 1/42; H02P 1/426;
(Continued)

(56) References Cited

U.S. PATENT DOCUMENTS

2003/0195644 A1   10/2003   Borders et al.
2016/0081865 A1   3/2016   Brosnan et al.

FOREIGN PATENT DOCUMENTS

CN       1905988 A    1/2007
CN     104137012 A    11/2014
(Continued)

OTHER PUBLICATIONS

Armin Hille, Electric Furniture Drive for Furniture, for Monitoring the Pulse Width Ratio of Electric Furniture Drive Method and Corresponding Furniture, Jan. 7, 2015, Clarivate Analytics, pp. 1-40. (Year: 2015).*

(Continued)

*Primary Examiner* — Antony M Paul
(74) *Attorney, Agent, or Firm* — Henry M. Feiereisen LLC

(57) ABSTRACT

An electromotive furniture drive includes a motorized adjustment drive for motorized adjustment of a furniture component, a control unit connected to a motor controller of the adjustment drive, and an operating unit for operating the adjustment drive. The control unit is designed, depending on the operating situation of the electromotive furniture drive, for driving, for stopping and/or for temporarily reversing a motor of the adjustment drive via the motor control. The motor is designed as a brushed DC motor. The control unit is designed to evaluate a frequency of a counter-EMF signal generated by the motor and to detect and signal a collision and/or a jamming incident as a function of the evaluated signal.

18 Claims, 3 Drawing Sheets

(58) Field of Classification Search
CPC .... H02P 1/465; H02P 1/46; H02P 3/00; H02P 3/08; H02P 6/00; H02P 6/08; H02P 6/157; H02P 6/182; H02P 6/24; H02P 6/30; H02P 7/00; H02P 7/03; H02P 7/04; H02P 25/00; H02P 25/022; H02P 25/12; H02P 27/06; H02P 27/08; H02P 7/05; A47C 20/041; A61G 7/018
See application file for complete search history.

(56) References Cited

FOREIGN PATENT DOCUMENTS

| CN | 104271005 A | * | 1/2015 | ............. A47C 17/04 |
|----|-------------|---|--------|--------------------------|
| CN | 107664746 A |   | 2/2018 |                          |
| CN | 109213074 A |   | 1/2019 |                          |
| CN | 109940622 A |   | 6/2019 |                          |
| DE | 44 44 762   |   | 6/1996 |                          |
| DE | 198 11 151  |   | 9/1999 |                          |
| DE | 202 13 758  |   | 10/2003 |                         |
| DE | 102016109524 |  | 7/2017 |                          |
| JP | 2013187966 A |  | 9/2013 |                          |
| WO | WO 2019/145440 | | 8/2019 |                         |

OTHER PUBLICATIONS

International Search Report issued by the European Patent Office in International Application PCT/EP2020/087180 on Apr. 6, 2021.
Chinese Search Report issued on Jun. 19, 2023 with respect to counterpart Chinese patent application 20208008723711.
Translation of Chinese Search Report issued on Jun. 19, 2023 with respect to counterpart Chinese patent application 20208008723711.

* cited by examiner

ELECTRIC MOTOR FURNITURE DRIVE

CROSS-REFERENCES TO RELATED APPLICATIONS

This application is the U.S. National Stage of International Application No. PCDEP2020/087180, filed Dec. 18, 2020, which designated the United States and has been published as International Publication No. WO 2021/123279 A1 and which claims the priority of German Patent Application, Serial. No. 10 2019 107 189.3, filed Dec. 20, 2019, pursuant to 35 U.S.C. 119(a) (d).

BACKGROUND OF THE INVENTION

The invention relates to an electromotive furniture drive having at least one motorized adjustment drive for motorized adjustment of at least one furniture component, at least one control unit which is connected to a motor control of the at least one adjustment drive, and at least one operating unit for operating the at least one adjustment drive, wherein the control unit is designed, depending on the operating situation of the electromotive furniture drive, for controlling, for stopping and/or for temporarily reversing a direction of rotation of at least one motor of the at least one adjustment drive, wherein the at least one motor is designed as a brushed DC motor.

In practice, such furniture drives are used, for example, for work tables or functional furniture such as armchairs or sofas. Beds or lifts, as well as patient lifts, are also possible applications for this type of furniture drive. Operating situations can occur in the form of overload or in the form of imminent danger to persons or objects, for example, if persons or objects are located in a danger zone and a potential danger is not recognized by the operator.

Furniture drives with a control unit that intervene in the adjustment process depending on the operating situation are known in the state of the art. An increase in the motor current or a reduction in the motor voltage is often detected and the operating situation is derived from this, for example in the form of a jamming situation. In such a jamming situation, the motor assigned to the adjustment function is then at least switched off, and possibly also reversed for a short time.

To detect an increase in motor current, the prior art uses appropriate sensors or shunts. Alternatively, the state of the art provides vibration and acceleration sensors or piezo sensors that are mechanically coupled to the adjustment drive or to a moving furniture component and detect a hard obstacle during the adjustment process. Such sensors have proven their worth, but their use requires a considerable amount of additional work in terms of assembly and material input, since a printed circuit board with appropriate assembly and wiring to the outside is required in the respective adjustment drive for connection to the control unit. Detection with additional sensors is more reliable than evaluation of the level of the motor current, but it complicates the design and assembly of the electromotive furniture drive.

The object of the present invention is to provide an arrangement that is improved over the evaluation of the magnitude of the motor current and yet is easy to install.

SUMMARY OF THE INVENTION

This task is solved by an electromotive furniture drive as set forth hereinafter.

It is provided that the control unit is designed to evaluate a frequency of a generated back EMF signal of the at least one motor. Since the motor of the positioning drive is designed as a DC motor with brushes, it generates a back EMF (electromotive force) signal from which its rotational speed can be derived. According to the invention, this signal is used to detect a drop in the rotational speed, which indicates a collision or a jamming incident.

This back EMF signal reflects the speed of the motor more reliably than evaluating the level of the motor current. The back EMF signal can nevertheless be obtained in an inexpensive manner from a measurement of the motor current, so that no additional sensor technology is required, which would complicate the design of the electromotive furniture drive.

Since they are generated by the motor itself, the evaluated signals are available at its connections. Since the connecting cable of the motor is designed as a two-wire cable, standardized motors can be used and, at the same time, it is advantageous to dispense with signal cables parallel to the motor cables. This saves assembly effort and material resources. The motor itself is designed as a brushed DC motor with permanent excitation. The typical operating voltage is less than 40 volts.

The back EMF is generated in direct dependence on the speed of the motor and is present as an alternating or pulsating voltage signal with a frequency that can be evaluated by the control unit. The control unit is designed to evaluate the frequency of this alternating or pulsating voltage signal.

In an advantageous embodiment, the control unit is designed to perform a setpoint/actual comparison and to execute a switching operation if the frequency of the signal falls below a predetermined threshold value and/or if an absolute value of the change in the frequency per unit of time exceeds a predetermined threshold value. In one embodiment, the target-actual comparison may also be event-related. Furthermore, the threshold value may be event-related as a variable threshold value within predetermined limits.

If the frequency falls below a previously defined and predetermined threshold value, for example, this can be evaluated as an overload of the variable speed drive, which leads to a shutdown of the respective motor. The predetermined threshold value can be permanently programmed, or can be based on events, for example the supply voltage, or can be selected based on the situation. For example, a startup situation can be distinguished from a continuation situation.

According to a preferred embodiment, the control unit performs an evaluation of the frequency mentioned at the beginning as a function of time. If the evaluated frequency changes by a predetermined value within a predetermined period of time, this can be evaluated as a jamming case. The respective motor is then switched off and/or, in one variant, can additionally be operated for a short period in the other direction of rotation.

The control unit is coupled to or integrated with a motor control unit. The motor control comprises mechanical or electromechanical switches for switching the respective motor on and off. For example, relays are used which switch the motor current. Alternatively, electronic switches in the form of semiconductor switches can be provided which switch the motor current. The latter design can be of discrete construction or be present as a compact component in the form of a so-called motor driver. MOSFET (metal-oxide semiconductor field effect transistor) transistors can preferably be used as semiconductor switches. These are characterized by low voltage losses in a switched-on state, which reduces losses and associated heat generation in the motor controller. In addition, the switching path (source-drain path) of a MOSFET exhibits the behavior of an ohmic resistor in the switched-on state, which makes it possible to use the switching path itself as a shunt for measuring the motor current. Alternatively, the motor current can be measured using an external current measurement sensor, e.g. an external shunt or a Hall sensor. This type of current measurement is also suitable if the motor control uses switches other than the MOSFETs mentioned. Such other switches are e.g. relays, possibly in combination with manually switching pushbuttons.

When using a motor driver, i.e. an integrated component which comprises the function of motor control, this can itself have an evaluation and processing of the aforementioned alternating or thresholding signals generated by the back EMF of the motor. Furthermore, the evaluation and processing can take place in such a way that an electrical signal corresponding to the speed of the motor is present at a signal output of the motor driver. This signal can be in the form of a variable frequency or a variable voltage.

Furthermore, the control unit is preferably equipped with a microcontroller on which an executable program runs. The program is designed to record the threshold value(s) mentioned at the beginning, to perform the setpoint/actual comparison mentioned at the beginning and to at least switch off the respective motor in an event-oriented manner.

The event of a collision or a jamming case is characterized by the fact that the speed of the motor reduces by more than a previously defined threshold value within a predetermined period of time. According to the invention, this is detected by means of the frequency of the back EMF signal of the motor, which is proportional to the speed of the motor. In order to perform a robust determination of the frequency of the back EMF signal that is not susceptible to interference, an averaging is advantageously performed over a current value of the frequency. Preferably, the averaging is performed as a moving average over a time window of fixed width.

BRIEF DESCRIPTION OF THE DRAWING

The invention is explained in more detail below with reference to examples of embodiments and figures. The figures show.

DETAILED DESCRIPTION OF PREFERRED EMBODIMENTS

Figure 1:
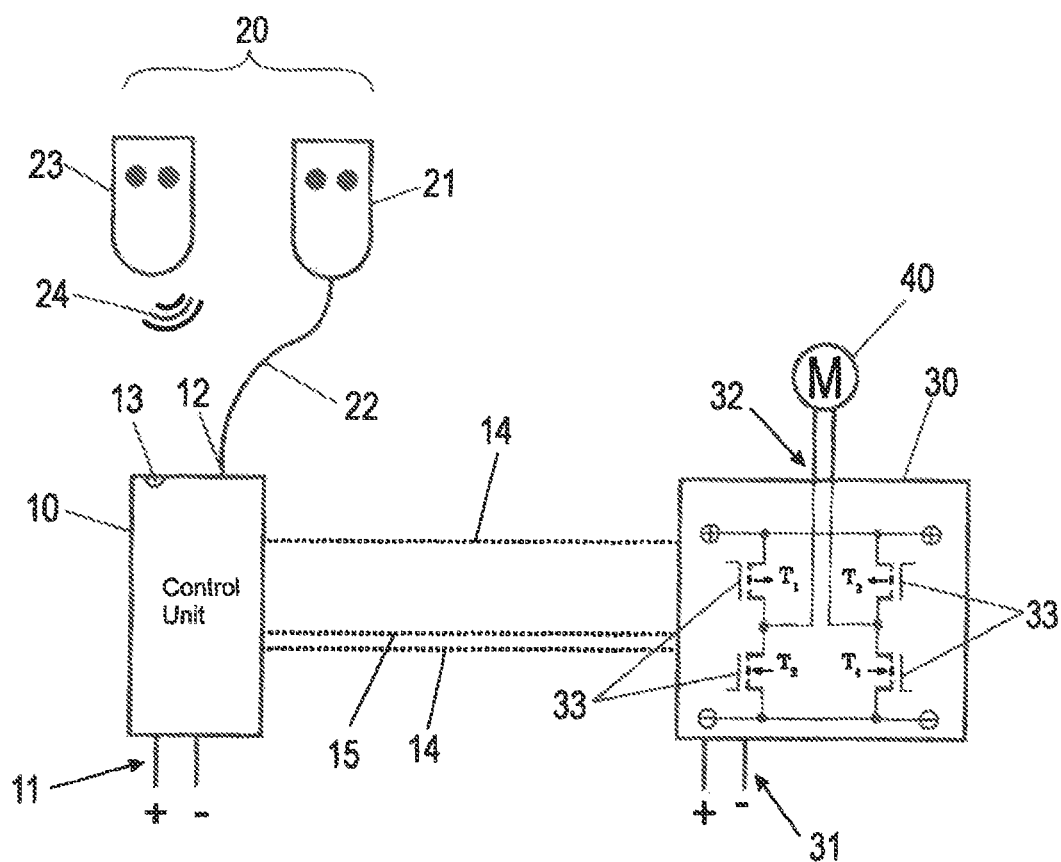
FIG. 1 a schematic representation of a first embodiment of an electromotive furniture drive in a block diagram.

FIG. 1 schematically illustrates a first embodiment of an electromotive furniture drive. The illustration is in the form of a block diagram, without reference to a piece of furniture in which the furniture drive is installed. In the furniture, the furniture drive serves to adjust at least one furniture component. The furniture can be, for example, a piece of seating or reclining furniture.

The furniture drive has a control unit 10 which is coupled to at least one operating unit 20. Two different operating units 20 are shown by way of example: a wired operating unit 21, which is connected to the control unit 10 via a connecting cable 22, and a wireless operating unit 23, which is connected to the control unit 10 via a radio link. The radio link is symbolized by a radio signal 24 in FIG. 1.

Depending on the embodiment of the control unit 10, it may be provided that only the wired operating unit 21 or only the wireless operating unit 23 can be used. In alternative embodiments, the wired or wireless operating unit 21, 23 can also be used alternatively, or both can be used in parallel. The wireless operating unit 23 may be specially manufactured for this purpose. Alternatively, it may also be possible to use a mobile terminal, for example a smartphone, with appropriate software as the wireless control unit 23.

The control unit 10 has a supply voltage connection 11 via which it is supplied with operating current. There may also be a connection 12 for the wired control unit 21 and/or a receiver 13 for the radio signal 24 of the wireless control unit 23.

In addition, the control unit 10 is connected via control lines 14 to a motor control unit 30 which controls a motor 40. The motor 40 is the motor of an adjustment drive for adjusting the aforementioned furniture component relative to a base frame of the furniture or relative to a further furniture component which may also be adjustable. A brushed DC motor is used as the motor 40.

Several adjustment drives can be used within a piece of furniture, whereby the control unit 10 is preferably used jointly for all existing adjustment drives, whereas a motor control 30 is provided for each adjustment drive.

The motor control unit 30 has a supply voltage terminal 31 which, like the supply voltage terminal 11 of the control unit 10, is connected to a power supply unit for supplying the furniture drive. This power supply unit is not shown here. It can be implemented in a structural unit with one or both of the units described, i.e. the control unit 10 and/or the motor control 30. Alternatively, it is conceivable to design the power supply unit separately and to couple it to the motor control unit 30 and/or the control unit 10. The power supply unit preferably outputs a very low DC voltage, for example in the range of about 24-32 volts, at its outputs, which is supplied to the control unit 10 and the motor control unit 30 as supply voltage.

Switching elements 33 are arranged in the motor control 30, which enable switching the motor 40 on and off as well as a direction selection. Semiconductor switches, in this case MOSFETs (metal-oxide semiconductor field-effect transistors), are provided as switching elements 33 in FIG. 1. These are arranged in the manner of an H-bridge, which permits reversal of the direction of rotation of the motor 40, The switching elements 33 can be controlled in a pulse-width modulated manner in order to influence a motor rotational speed or a motor torque and thus allow, for example, a soft start of the motor 40.

During operation of the electric motor furniture drive, operating inputs of a user at one of the operating units 20 are evaluated by the control unit 10 and converted into control signals on the control lines 14, which control the motor control 30 according to the operation of the user. Within the motor control unit 30, a measurement of the current drawn by the motor 30 is made. Information reflecting the measured motor current is fed back from the motor control 30 to the control unit 10 via a current measurement line 15. This can be in the form of an analog signal or in the form of digital data.

As will be explained in more detail below, an evaluation of the signals or data of the current sensing line 15 is performed within the control unit 10 in order to detect a collision and/or a case of entrapment (jamming). As a consequence of a detected collision and/or a jamming incident, the motor control 30 can be controlled by the control unit 10 in such a way that the motor 40 stops its movement or briefly changes its direction of rotation and then stops in order to resolve a possible jamming incident.

In the embodiment example of FIG. 1, in which MOSFETs are used as switching elements 33, a voltage drop across the switching elements 33 can be evaluated as a measure of the motor current. Alternatively, it is also conceivable that an additional current measurement sensor is present, for example a Hall sensor or a shunt, via which the motor current is determined.

Figure 2:
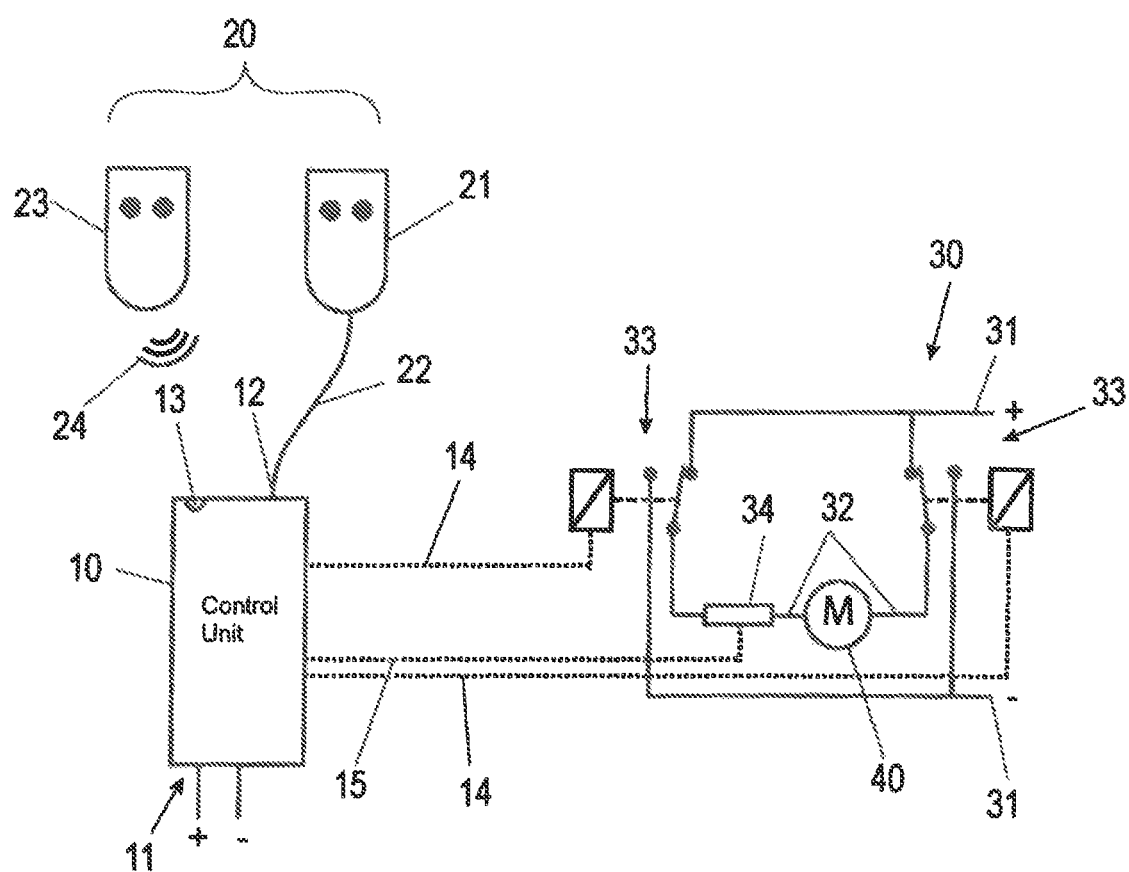
FIG. 2 a schematic representation of a second embodiment of an electromotive furniture drive in a block diagram.

FIG. 2 shows in the same way as FIG. 1 an alternative design of an electric motor furniture drive. With regard to the basic structure, reference is made to the embodiment example of FIG. 1. The differences to this first embodiment example are shown below.

Unlike the embodiment example of FIG. 1, the motor control 30 according to FIG. 2 uses relays with corresponding switching contacts as switching elements 33 instead of the MOSFETs of FIG. 1. Except for the possibility of performing pulse-width modulated control of the motor 40, the function of the relays as switching elements 33 is analogous to that of the H-bridge with the MOSFETs in the first embodiment example. In FIG. 2, a rest position of both relays is shown, which is assumed when there is no actuation at one of the operating units 20. In this rest position, the motor 40 is short-circuited, which brakes it generatively.

In order to measure the current of the motor 40, a separate current measurement sensor 34 is provided here, which is arranged in a series circuit with the motor 40. As already mentioned in connection with FIG. 1, in which this type of current measurement was mentioned as an alternative, the current measurement sensor 34 can be a shunt sensor or a Hall sensor.

Figure 3:
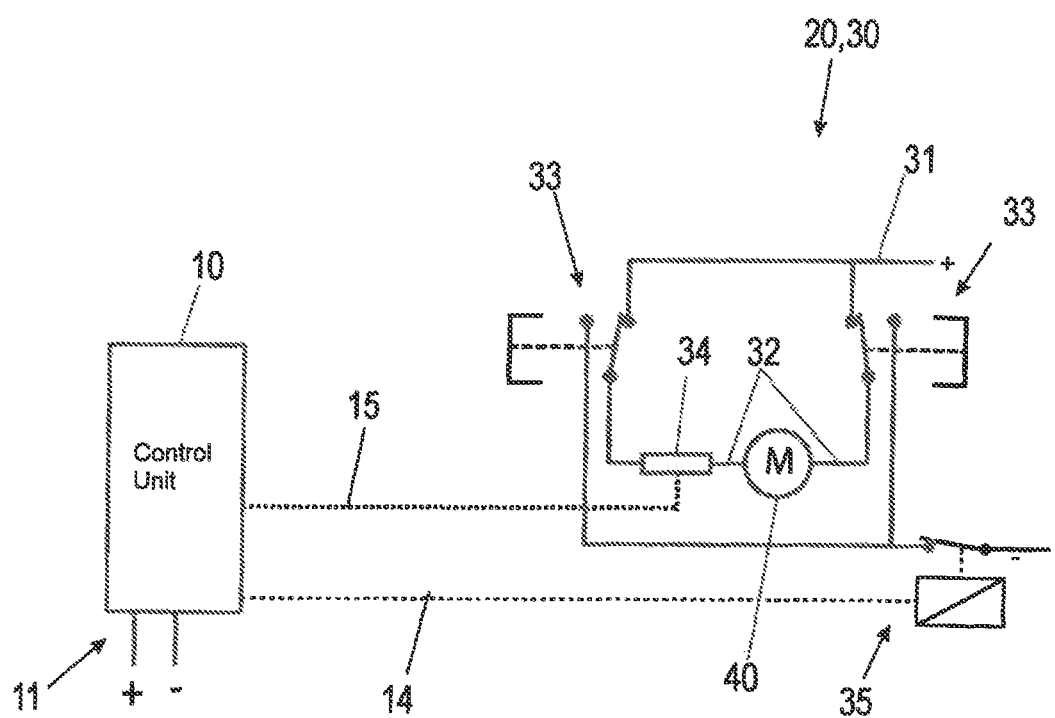
FIG. 3 a schematic representation of a third embodiment of an electromotive furniture drive in a block diagram.

Finally, FIG. 3 shows a third possible embodiment of an electronic motor furniture drive.

In contrast to the previously described embodiments, here the motor control 30 and an operating unit 20 are designed to be integrated in that switching elements 33, which switch the motor current, are manually actuated pushbutton switches, which thus directly form the switches of the operating unit 20. When one of the two switching elements 33 is manually actuated, the motor is switched on in a different direction of rotation in each case.

Again, a current measurement sensor 34 is provided to perform a current measurement and to provide the measured motor current to the control unit 10 for evaluation via the current measurement line 15.

Accordingly, in this embodiment, the control unit 10 does not have any connection options for a separate operating unit 20. In order to be able to stop the motor 40 in the event of a detected collision or a jamming incident, a higher-level switching element 35 is provided in the motor control unit 30, which can interrupt a supply voltage for the electric motor 40, The higher-level switching element 35 is designed here, by way of example, as a relay with a normally closed contact.

In all three embodiments shown, monitoring of the signal or data at the current sensing terminal 15 occurs in the control unit 10 during operation of the electric motor 40 to detect a collision and/or a jamming condition. When the motor a brushed DC motor, an alternating signal is superimposed on a DC component when the motor is rotated, which signal originates from the commutation of the motor and is also referred to as a back EMF (electromotive force) signal. The frequency of the back EMF signal is proportional to a speed of the motor.

According to the application, the frequency of this signal and thus a frequency proportional to the speed of the motor is now used to detect a collision or a jamming incident. For this purpose, for example, a limit frequency can be specified as a threshold value, the undershooting of which indicates a collision or a jamming incident. Further, a rate of change of the frequency can be observed. If the frequency changes during operation at a rate whose value exceeds another predefined threshold value, this also indicates a collision or a case of entrapment.

In a further development, it can be provided that the threshold value for the frequency is not fixed, but is determined in one or more learning runs. For this purpose, the positioning drive is actuated over the entire travel range in a learning phase and the frequency of the back EMF signal is measured. A minimum frequency value can then be detected which is exceeded during the entire learning phase, i.e. at every position within the entire travel range of the positioning drive. A tolerance fraction, for example 20%, is subtracted from this minimum frequency value, which is reached in the normal case, i.e. without collision or not in the jamming incident, to form the threshold value. If this threshold value is not reached during operation, this indicates a collision or jamming.

The threshold value can be the same over the entire travel distance of the electromotive furniture drive, regardless of whether it is fixed or detected in a teach-in run. However, it can also be provided that this threshold value is defined in sections over the travel distance. For this purpose, the travel distance can be divided into at least two, possibly several or many sections, in each of which a separate threshold value is specified or determined in a learning phase. This then takes into account the fact that certain movement sections of the travel path are exposed to different loads due to the lever kinematics of a furniture fitting that is moved by the electric motor furniture drive, resulting in a different rotational speed of the motor and thus frequency of the back EMF even in normal operation, i.e. without collision and without a jamming incident. In this embodiment, knowledge of the current position of the variable displacement drive is necessary. This can also be detected, for example, on the basis of a limit switch actuation with the aid of the back EMF by counting pulses of the back EMF signal. The number of pulses counted is then a measure of the current position of the positioning drive, which can then be used to call up the position-dependent threshold value or determine it during a learning phase.

LIST OF REFERENCE SIGNS 10 control unit
11 supply voltage connection
12 manual switch connection
13 receiver
14 control line
15 current measurement connection
20 operating unit (manual switch)
21 wired control panel
22 connection cable
23 wireless control panel
24 radio signal
30 motor control
31 supply voltage connection
32 motor connection
33 switching element
34 current measurement sensor
35 higher-level switching device
40 motor

What is claimed is:

1. An electromotive furniture drive, comprising:
   a motorized adjustment drive for motorized adjustment of a furniture component, said adjustment drive including a motor designed as a brush-loaded DC motor and a motor controller;
   an operating unit for operating the adjustment drive; and
   a control unit connected to the motor controller of the adjustment drive, said control unit being designed, as a function of an operating situation of the electromotive furniture drive, to actuate, to stop or to temporarily reverse the motor of the adjustment drive via the motor controller, to evaluate a frequency of a counter-EMF signal generated by the motor and to detect and signal a collision and/or a jamming case as a function of the evaluated counter-EMF signal.

2. The electric motor furniture drive of claim 1, wherein the control unit is designed to switch off the motor and/or to reverse a direction of rotation of the motor after detection of the collision and/or the jamming case.

3. The electric motor furniture drive of claim 1, wherein the control unit is designed to detect the collision and/or the jamming case when the frequency of the counter-EMF signal falls below a predetermined threshold value.

4. The electric motor furniture drive of claim 3, wherein the threshold value is fixedly predetermined.

5. The electric motor furniture drive of claim 3, wherein the threshold value is determined in a learning phase in which the adjustment drive is moved without collision and/or a jamming case.

6. The electric motor furniture drive of claim 3, wherein the threshold value is constant over an entire travel distance of the adjustment drive.

7. The electric motor furniture drive of claim 3, wherein the threshold value is different in different sections of a travel path of the adjustment drive.

8. The electric motor furniture drive of claim 3, wherein the threshold value is varied according to the operating situation.

9. The electric motor furniture drive of claim 1, wherein the control unit is designed to detect the collision and/or the jamming case when an absolute value of a change in frequency exceeds a predetermined threshold value.

10. The electric motor furniture drive of claim 9, wherein the threshold value is fixedly predetermined.

11. The electric motor furniture drive of claim 9, wherein the threshold value is determined in a learning phase in which the adjustment drive is moved without collision and/or a jamming case.

12. The electric motor furniture drive of claim 9, wherein the threshold value is constant over an entire travel distance of the adjustment drive.

13. The electric motor furniture drive of claim 9, wherein the threshold value is different in different sections of a travel path of the adjustment drive.

14. The electric motor furniture drive of claim 9, wherein the threshold value is varied according to the operating situation.

15. The electric motor furniture drive of claim 1, wherein the counter-EMF signal is obtained based on a measurement of an operating current of the motor.

16. The electric motor furniture drive of claim 15, further comprising a current measurement sensor in a form of a shunt or a Hall sensor for measuring the operating current of the motor.

17. The electric motor furniture drive of claim 15, wherein the motor controller comprises a MOSFET transistor as switching element.

18. The electric motor furniture drive of claim 17, wherein the MOSFET transistor includes a drain-source switching path which is used as a current measurement sensor for measuring the operating current of the motor.

* * * * *